May 22, 1934.  F. KELLER ET AL  1,959,830
AUTOMOBILE OR VEHICLE HEADLIGHT
Original Filed Nov. 14, 1928  2 Sheets-Sheet 2
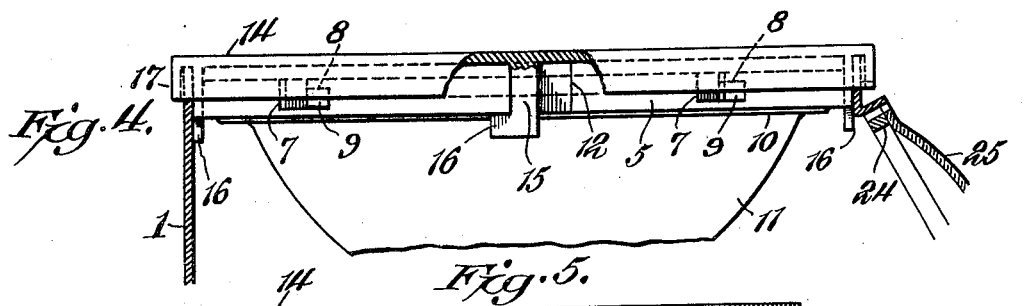
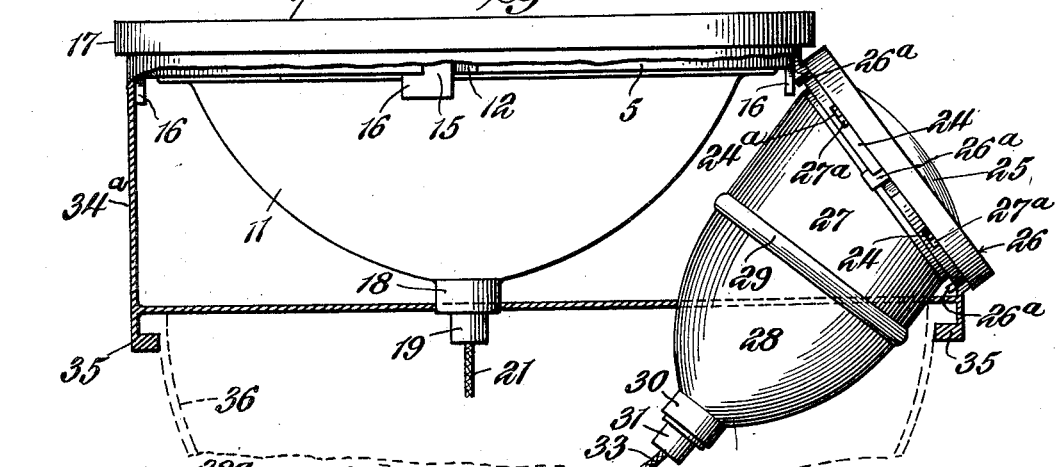
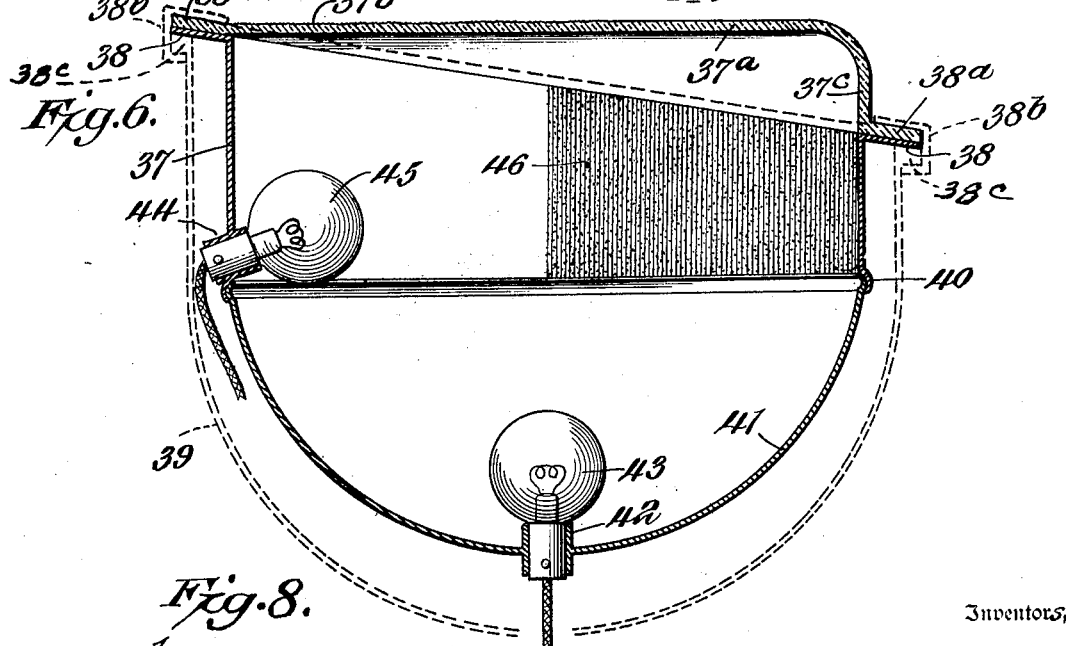

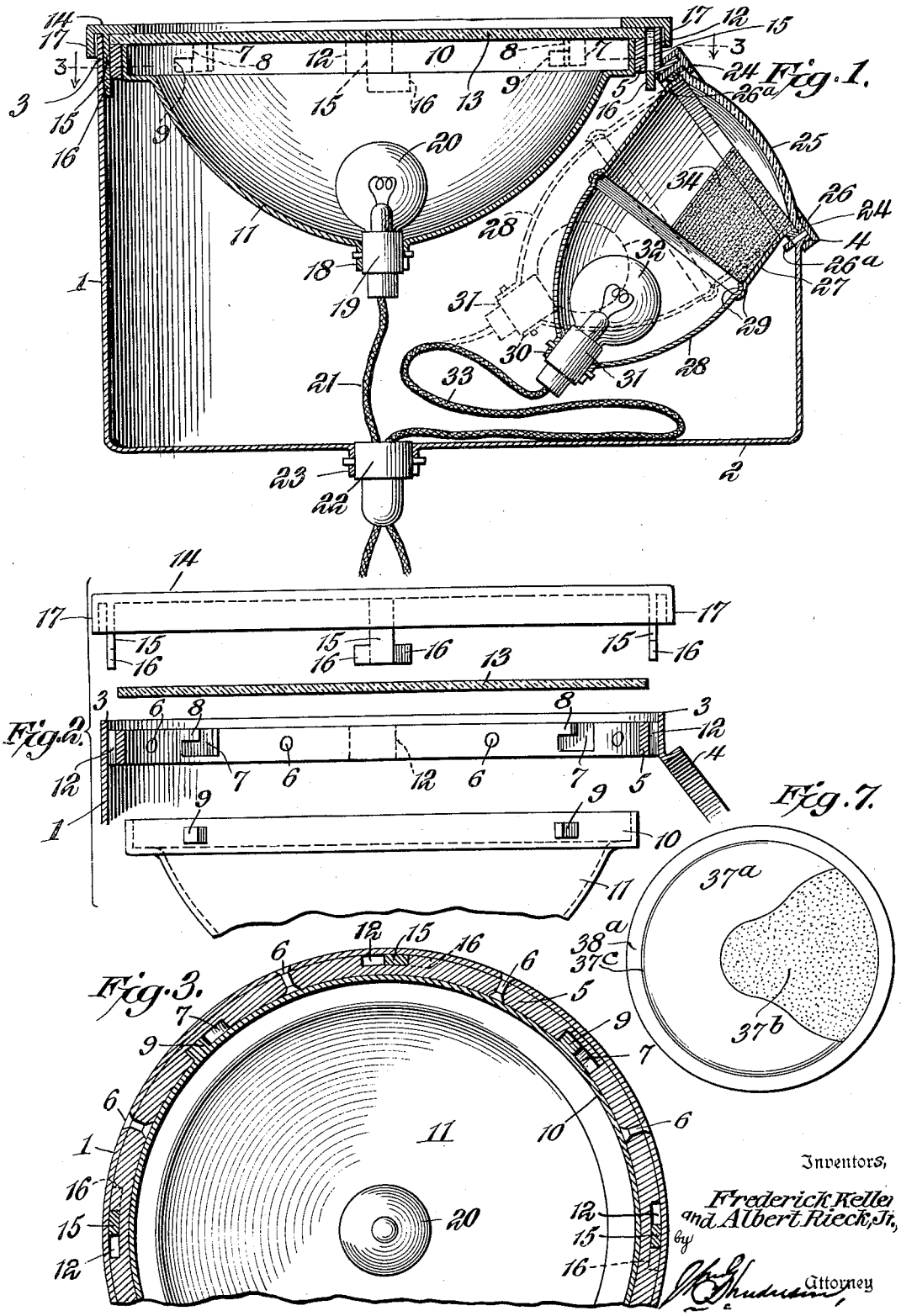

Patented May 22, 1934

1,959,830

UNITED STATES PATENT OFFICE 1,959,830

AUTOMOBILE OR VEHICLE HEADLIGHT

Frederick Keller and Albert Rieck, Jr.,
Atlantic City, N. J.

Application November 14, 1928, Serial No. 319,293
Renewed April 4, 1932

8 Claims. (Cl. 240—41.2)

This invention relates to headlights for automobiles and other vehicles.

The primary object is to provide means, which may be operated independently of the main headlights, to direct beams of light to the right or the left hand side of the roadway, to illuminate either edge portion thereof, without interfering with the ordinary straight-ahead illumination or causing any undue glare in the eyes of drivers of oncoming vehicles.

Another object is to provide such means in the form of a spot-light device which may be incorporated, as an independent unit, in the structure of the headlight to form a component part thereof, or which may be formed in a manner to be applied to the front portions of the ordinary headlight-casings to take the place of the ordinary illuminating elements thereof and combine means for straight-ahead illumination as well as the aforesaid spot-light features for illuminating the side edges of the roadway.

A full and complete understanding of the invention may be obtained from a consideration of the following detailed description, taken in connection with the accompanying drawings forming a part of this specification; it being understood that while the drawings show practical forms of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures;

Figure 1 is a horizontal sectional view through a headlight constructed in accordance with the present invention;

Figure 2 is a group view, showing some of the parts separated and partly in section;

Figure 3 is a transverse sectional view, taken on the line 3—3 of Fig. 1 and looking in the direction of the arrows;

Figure 4 is a detail side elevation, partly broken away, to further illustrate means for holding the parts of the headlight in assembled relation;

Figure 5 is a plan view, partly in section, showing a modified form of the invention, wherein the means for straight-ahead and for side illumination are embodied in one unit and adapted to be attached to the front of an ordinary headlight casing to take the place of the ordinary illuminating means therein;

Figure 6 is a horizontal section showing a further modification to be used in connection with another form of headlight casing;

Figure 7 is a plan view of the lens shown in Fig. 6, looking at the front of the lens;

Figure 8 is a front elevation of a pair of headlights and showing the path of the light rays for illuminating the sides of the road.

In Figures 1 to 4, inclusive, of the drawings, there is shown in the preferred embodiment of the invention, wherein a special casing is employed for housing the usual reflector, lens and light for the ordinary illumination ahead of the automobile and wherein there is also housed a unit which may be adjusted to direct rays of light in a downwardly-inclined path towards the side of the roadway without interfering in any degree with the said ordinary illumination, the object of the said side illumination being to light up curves, road signs, ditches, etc., etc., and add materially to the safety of night driving. It will be observed, as the invention is better understood, that the above objects are obtained by non-glaring means which are easily removed, without disturbing the main illuminating elements of the headlight, for the purpose of replacing the electric lamp in the side-lighting unit or for adjusting the latter to different positions.

The preferred embodiment of the invention comprises a sheet metal casing 1, preferably of drum-like formation, having a closed rear end 2 and normally open at its front end 3. The casing 1 is provided at its open end with a relatively small annular flange 4, extending outwardly at one side of the open end 3, said flange being formed at an angle and affording communication with the interior of the casing which is somewhat wider in rear of the flange than at the open end 3, as clearly shown in Figure 1 of the drawings.

The means for illuminating the roadway ahead of the automobile, in the ordinary manner, are adapted to be mounted within the open end 3 of the casing and may be of the usual size and proportions in common use, while the improved spot light unit of the present invention is adapted to be mounted and adjusted for use within the flange 4 in a manner to be described, and the improved means for holding the latter in position are identical with those employed for holding the elements of the main illuminating means in position though necessarily on a smaller scale.

For the purpose of mounting the main illuminating elements, the open end 3 of the casing is provided with a supplemental ring 5, snugly fitting the interior diameter of the open end 3 and held therein by spaced rivets 6, or, if desired, the same may be brazed, soldered or otherwise secured in position with the outer edge of the ring in spaced relation to the edge of the casing, as more clearly shown in Figure 2 of the drawings.

The ring 5 is provided on its inner face with L-shaped recesses 7 extending part way through the ring and providing shoulders or abutments 8, for a purpose to be explained, said recesses being located at diametrically-opposite points around the ring, and preferably four or six in number. Adapted to co-act with these recesses are corresponding lugs 9 formed on the enlarged rim portion 10 of the usual parabolic reflector 11 which is adapted to be slipped within the ring 5, with the lugs registering with the entrances of the recesses and to be slightly turned to cause said lugs to bear against the abutments 8 to rigidly hold the reflector in place within the ring.

The ring 5 is also provided, at points intermediate between the aforesaid recesses 7, with a series of slots 12, arranged vertically and closed on their outer sides by the walls of the casing 1 to form passageways for a purpose to be explained. An ordinary lens 13, such as is employed in headlights for automobiles, is placed within the open end 3 of the casing to rest against the outer edge of the ring 5 and is adapted to be held in place by a detachable, annular rim 14 having inwardly projecting locking arms 15 provided with terminal lugs 16 which engage with the inner edge of the ring 5, at one side of the slots 12 in an obvious manner, after the arms and lugs have been passed through the slots and the rim 14 given a slight rotary movement. The rim 14 is provided with an inwardly directed, peripheral flange 17 which extends considerably over the open end 3 of the casing to exclude rain and moisture, while the inner edge of the rim overhangs the periphery of the lens and may be provided with the usual rubber or other resilient cushion (not shown).

At the center and rear portion of the parabolic reflector 11 there is provided the usual extending sleeve 18 having bayonet slots for the detachable connection of a socket 19 having a lamp 20 and a wire connection 21 which extends through the usual socket 22 mounted in the usual extension 23 at the rear of the casing, said wire extending to the usual source of electrical energy on the automobile.

From the foregoing, it will be seen that simple and efficient means have been provided for holding the component parts or elements of the main illuminating means within the casing of the headlight and that the same rigidly hold the reflector, lens and lamp in position while at the same time readily permitting their removal for replacing the lamp or for other purposes. The same construction and arrangement of parts are employed for holding the supplemental or side illuminating means in position within the aforesaid inclined or angular opening formed by the flange 4, though on a smaller scale, as is obvious.

To this end the flange is provided with a ring 24 adapted to co-act with an annular rim 26 which is formed to overhang the flange 4 on the exterior of the latter and has an inwardly projecting flange to overhang the peripheral portion of a lens 25 which is preferably of the concave-convex type, as clearly shown in Figure 1 of the drawings. The rim 26 is provided with locking arms 26a, similar to the aforesaid arms 15, and which are passed through slots similar to the slots 12, and slightly turned to lock the rim in position. The ring 24 is further provided with recesses 24a for coaction with a supplemental casing 27 which has spaced lugs 27a to interlock with the same in an obvious manner. The supplemental casing 27 is of tubular form and has its outer end formed at an angle to support said casing at an angle to the plane of the flange 4, all of which is more clearly shown in Figures 1 and 4 of the drawings.

The rear end portion of the supplemental casing is in the form of a reflector 28 of parabolic form having its inner surface highly polished and preferably arranged to be readily detached from the front portion, the two members 27 and 28 having interfitting, terminal flange portions 29 which are adapted to be snapped, one over the other, to hold the two members together and to permit of their ready detachment. The supplemental casing may, however, consist of a single member if so desired. The rear end of the reflector 28 is provided with an ordinary tubular extension 30 into which there is secured a lamp socket 31 having a lamp 32 and an electrical conductor 33 extending to and through the aforesaid socket 22 to the source of electrical energy, and which will be associated with a switch (not shown) of any suitable well known type for cutting the electrical current in and out.

Substantially one-half of the inner surface of the tubular casing 27 is coated with some dull black light-absorbing material, such as paint or other suitable material 34 which will not reflect the light from the lamp 32. This non-reflecting portion of the casing is located toward the outer portion of the lens 25 or toward the wall of the main casing 1, so as not to reflect the rays of light directly towards the front of the car, while the remainder of the interior face of the tubular casing 27 is highly polished to direct the said rays through the lens 25 to the side of the roadway. The extension conductor 33 is of sufficient length to permit the entire casing, as comprised by the members 27 and 28, to be drawn through the opening defined by the flange 4, after the rim 26 and lens 25 have been removed, and the member 27 detached from the member 28 to permit replacement of the lamp 32 or for other purposes, without the necessity for disturbing the elements of the main headlight. By providing a plurality of the recesses 24a and lugs 27a it will be seen that the supplemental casing may be more or less turned or rotated to change the angle of the spot light to the desired point along the edge of the road, as indicated in dotted lines in Figure 1.

In the modification shown in Figure 5, the casing 34a is adapted to engage, by suitable locking means 35, with the open front end of an ordinary headlight casing 36, in which case the lighting and reflecting means are removed therefrom and are carried by the casing 34a in the form of the reflector 11 and locking means 5, 12, 15, etc., similar to the form (Figs. 1 and 2) already described. The casing 34a is also provided with an opening defined by an inclined flange corresponding to the flange 4 and adapted to hold the detachable spot light in the same manner as before described, the rear end of the latter, however, in this form of attachment, extends through the rear wall of the supplemental casing 34a which is somewhat shallower than the casing 1, and into the headlight casing 36 so as to enable the connection of the wires 21 and 33 to the socket of the headlight 36.

The modified form of the invention, as disclosed in Fig. 6 of the drawings includes a cylindrical casing 37, having an inclined front lid formed with a marginal flange 38 and providing a long and a short side. The casing is adapted to be inserted within the body of a main headlight casing 39, having its front open end inclined to correspond to the casing 37, and, through the medium of any suitable form of fastening rim, the entire attachment may be held in position. A specially formed lens 37a is adapted to be held against the flange 38 of the casing through the medium of a marginal flange 38a, formed integral with the lens and engaging beneath the aforesaid fastening rim indicated at 38b. The rim may have means for interlocking engagement with spaced lugs 38c formed on the main casing 39, as indicated in dotted lines in Fig. 6, to facilitate its application and removal. The lens is provided with a circumferential wall 37c at that side corresponding to the short side of the casing 37, so that the front flat face thereof, or lens proper, extends squarely across the front of the headlight, in the usual manner, while the flange 38a fits flat against the casing flange 38 to be clamped by the rim 38b. The front face of the lens is frosted, as indicated at 37b, at the side opposite to the wall 37c, so that light rays, from means about to be described, will be dimmed at the frosted portion and caused to pass undimmed through the unfrosted portion of the lens and also through the wall 37c, to illuminate the side of the roadway immediately in advance of the vehicle.

To change the direction of the light rays in this form of the device, the clamping ring 38b is released from the lugs 38c of the casing and the reflector and lens rotated as a unit the required degree on the reflector seat and the clamping ring again secured in position to fix the reflector and lens to their adjusted position. This adjustment of the parts moves the lamp 45 in a circumferential path and causes the light rays to be projected downwardly or sidewise to illuminate the roadway directly in front of or to one side of the vehicle, depending on the adjustment. The rays are reflected from the surface of the wide portion of the tubular section 37 of the reflector adjacent the lamp mounting, past the narrow portion of the tubular section and through the side wall 37c of the lens. The frosted portion 37b of the lens diffuses the light passing therethrough, while the coated portion 46 of the tubular extension of the reflector prevents the reflection of light through the clear portion 37a of the lens. By means of this adjustment of the reflector due to the inclination of the forward edge of the reflector and its inclined seat on the lamp casing 39, the position of the lamp 43 may be shifted around the axis of the casing 39 to change the direction of the light rays emanating therefrom to control the illumination of the roadway in advance of the vehicle. The beam of light may either be directed to the center of the roadway or to one side, as desired.

The casing 37 is preferably provided on its rear edge with the joint 40 for detachable connection with the parabolic reflector 41 which has the centrally located sleeve 42 to receive a lamp 43 which acts as the main headlight for illuminating the roadway through the unfrosted portions of the lens in advance of the automobile in the ordinary manner. The cylindrical casing 37 of the present form of the invention is provided at its inner edge and at the longer side thereof, with a sleeve 44 for the reception of a lamp 45 which is located behind the frosted area 37b of the lens, and at the opposite side of the casing, the interior wall is coated, as at 46, in the same manner as hereinbefore described and for a similar purpose.

In all forms of the invention, the supplemental or spot light elements are preferably arranged and located so as to be on the inner side of each of the headlights, as shown in Figure 8 and disposed so as to direct the rays of light across the front of the automobile in the manner indicated. It is to be understood, however, that the supplemental or spot light elements may be otherwise located and arranged on the headlights, depending on the type of fenders used on the car, it being desirable or necessary in some instance, to position the spot lights on the outer sides.

From the foregoing, it will be seen that simple and inexpensive means have been provided which may be incorporated in headlight structures or which may be made as attachments for ordinary headlights, to enable the driver to light up the sides of roads without interfering with the functioning of the straight ahead illuminating means and that the invention enables the easy detachment of all the parts for ready access for replacement or other purposes.

Having fully described the invention, and set forth its merits, what we claim is:—

1. In a headlight having a casing provided with a straight front to receive a straight-ahead illuminating unit and a flanged opening at its inner side and arranged at an inclined angle to the front face; a slotted ring fixed within the angularly disposed flange of the side opening; a detachable spot-light unit rotatively mounted in said flanged opening and comprising a tubular section having lugs to lock in certain of the slots of the slotted ring of the side opening; a lens adapted to rest against the slotted ring; a locking rim having arms provided with lugs to engage in slots of the ring and lock the unit in adjusted rotary position.

2. In a headlight having a casing provided with a straight front to receive a straight-ahead illuminating unit and a flanged opening at its inner side and arranged at an angle to the front face; a slotted ring fixed within the angular flange; a detachable spot-light unit adapted to the flanged opening and comprising a tubular section having lugs to lock in certain of said slots; a lens adapted to rest against the slotted ring; a locking rim having arms provided with lugs to engage in the other slots of the ring and lock the unit in adjusted rotary position; a parabolic reflector detachably connected to the rear end of the tubular section and carrying a lamp.

3. In a headlight having a casing provided with a straight front to receive a straight-ahead illuminating unit and a flanged opening at its inner side and arranged at an angle to the front face; a slotted ring fixed within the angular flange; a detachable spot-light unit adapted to the flanged opening and comprising a tubular section having lugs to lock in certain of said slots; a lens adapted to rest against the slotted ring; a locking rim having arms provided with lugs to engage in the other slots of the ring and lock the unit in adjusted rotary position; the tubular section having one-half of its interior wall of non-reflecting surface; and a parabolic reflector detachably connected to the rear end of the section and carrying a lamp.

4. A headlight comprising a casing having a straight front opening for a main light unit and an angularly-disposed smaller opening at one side thereof for a spotlight unit; each of the openings having a fixed ring therein and provided with internal L-shaped recesses and external slots; a parabolic lamp-carrying reflector fitted in the larger ring and having radial lugs to interlock in the recesses; a lens adapted to bear on the ring; a locking rim having L-shaped arms to interlock in the slots and hold the lens in place; a tubular casing having a bevelled front end provided with radial lugs to interlock in the L-shaped recesses of the smaller ring and having substantially one-half its interior surface coated with light-absorbing material; a lens adapted to rest on the smaller ring; a locking rim having L-shaped arms to interlock with the slots of the smaller ring; and a parabolic lamp-carrying reflector adapted to snap into engagement with the rear end of the tubular casing to direct the rays from the smaller unit to one side of the road while the light-absorbing material prevents said rays from being directed to the front.

5. In a light projector, a casing having an opening provided with a flange positioned in a plane inclined to the axis of the casing, a reflector, a cylindrical extension detachably mounted on said reflector and having its forward edge inclined to the axis of the reflector, a source of light mounted in the reflector, said cylindrical extension being rotatably adjustable on the flange of the casing to change the direction of the light rays from the source of light, and means for securing the forward edge of the extension to the flange of the casing in its adjusted position.

6. In a light projector, a casing having an opening provided with a reflector seat positioned in a plane inclined to the axis of the casing, a reflector provided with a cylindrical extension having its outer edge inclined to the axis of the reflector, a reflecting surface on the cylindrical extension at its greatest depth and a non-reflecting surface at its lesser depth, a source of light mounted in the reflector, said reflector being rotatable thereon and adjustably secured to said reflector seat to change the position of the light source with relation to the casing and the direction of the light rays, and means for locking said inclined edge of the reflector to said reflector seat.

7. In a light projector comprising a casing having an opening provided with a reflector seat positioned in a plane inclined to the axis of the casing, a parabolic reflector provided with a cylindrical extension having its forward edge inclined to the axis of the reflector and adapted to seat on said reflector seat, a source of light mounted on the wall of the cylindrical extension at its greatest depth, a lens having a circumferentially extending base-line corresponding to the inclination of the forward edge of the reflector and adapted to be seated thereon, said lens having a circumferential wall for the emission of light rays and means for adjustably securing said reflector and lens on said reflector seat to change the direction of rays of light passing through the circumferential wall.

8. In a light projector comprising a casing provided with an opening having a reflector seat positioned in a plane inclined to the axis of the casing, a reflector provided with a cylindrical extension having its outer edge inclined to the axis of the reflector and adapted to seat on the reflector seat, a lamp mounted on the wall of the cylindrical extension at its greatest depth and a non-reflecting surface at its lesser depth, a lens seated on said inclined edge of the reflector and formed with a circumferential wall at the edge of said lens to permit the light rays to pass therethrough, and a portion of the face of the lens suitably formed to dim the light rays passing therethrough, whereby the light rays are projected laterally of the projector.

FREDERICK KELLER.
ALBERT RIECK, Jr.